United States Patent Office 3,285,867
Patented Nov. 15, 1966

3,285,867
TRIETHYLENE-TETRAMINE-BENZOTHIAZYL DISULFIDE VULCANIZATE OF AN ACRYLIC ACID ESTER-NEUTRAL HALOALKYL VINYL COMPOUND INTERPOLYMER STABILIZED WITH A COPPER SALT OF A SATURATED STRAIGHT CHAIN FATTY ACID
Harold A. Tucker, Parma Heights, Ohio, assignor to The B. F. Goodrich Company, New York, N.Y., a corporation of New York
No Drawing. Filed Aug. 29, 1963, Ser. No. 305,506
4 Claims. (Cl. 260—23)

This invention relates to improvement in high-temperature, air-aging properties of certain vulcanizates of elastomeric polymers of acrylic acid esters and neutral haloalkyl vinyl compounds. More particularly it relates to the production of said improved properties in the said class of elastomeric vulcanizates by the very unusual addition thereto of compounds of copper.

Elastomeric polymers of acrylic acid ester and halogen containing derivatives are chemically saturated thermoplastic materials which can be thermoset or "cured" through the active halogen center. Variations in loading pigments or curative agents lead to a spectrum of products having hardness properties ranging from soft gums to very hard rubbers. The cured polymers have excellent resistance to heat aging in air of non-aqueous media, to ultraviolet light, ozone, and flexural breakdown. Specially compounded stocks made from them have excellent electrical properties.

Present day industrial demands call for products with ever increasing durability with respect to heat aging. Such durability is an outstanding characteristic of the chlorine containing polyacrylate elastomers, but I have surprisingly discovered that this durability can be greatly increased by the addition of a small amount of copper, a material commonly considered harmful to elastomeric products. When less than 0.5 part of copper, in the form of a carboxylate, is added to the elastomer, a remarkable increase in retention of physical properties is noted when the cured elastomer is exposed to hot air aging. The chlorine containing polyacrylate elastomers are known articles of commerce.

Copolymers of alkyl acrylates and chloroalkyl vinyl ethers or chloroalkyl acrylates were initially developed by Eastern Regional Laboratories, United States Department of Agriculture as Lactoprene EV. The materials are described in Industrial Engineering Chemistry 38, 960 (1946). They are compatible with plasticizers and other elastomers as described in India Rubber World 113, 223 (1945). As compared to straight polyethyl acrylate, these copolymers are found to be better milling, to have less tendency to scorch during cure, to mold more readily, and to be more water resistant in the vulcanized form.

Any of the alkyl acrylates may be employed in the monomeric mixture to be polymerized and used according to this invention, but those containing from 4 to 8 carbon atoms are preferred. Illustrative alkyl acrylates in this class are methyl acrylate, ethyl acrylate, n-propyl acrylate, isopropyl acrylate, n-butyl acrylate, secbutyl acrylate, isobutyl acylate, n-amyl acrylate, and others. Best results are achieved with either methyl or ethyl acrylate since these esters yield the strongest interpolymers. It is also within the contemplation of this invention to utilize mixtures of any of the alkyl acrylates, including mixtures of two or more of the lower alkyl acrylates containing from 4 to 8 carbon atoms and mixtures containing one or more of the lower alkyl acrylates with one or more of the higher alkyl acrylates such as those containing 8 to 14 carbon atoms. The latter mixtures interpolymerize with the haloalkyl vinyl compound to produce vulcanizable polymers which are very easily processed and which are possessed of very satisfactory curing rates.

The compounds referred to above as neutral polymerizable haloalkyl vinyl compounds, at least one of which is also used in the monomeric mixture, may be further characterized as being compounds composed exclusively of carbon, hydrogen, oxygen and halogen atoms and having a single vinyl

group separated from a haloalkyl group by an intervening oxygen-containing structure. The significance of this juxtaposition of the vinyl and haloalkyl groups lies in the fact that such haloalkyl vinyl compounds copolymerize with the alkyl acrylates to generate a polymeric chain having haloalkyl groups as side chains thusly

wherein A is an oxygen linkage hereinafter defined and X is halogen. Other halogen-containing vinyl compounds such as vinyl chloride, vinylidene chloride or vinyl fluoride copolymerize with the alkyl acrylates to produce carbon-to-carbon chains having halogen atoms directly attached to chain carbon atoms thusly

Alkyl acrylate interpolymers having side-chain halogen substitution can be cured or "vulcanized" to a soft, strong and rubber-like condition whereas interpolymers of alkyl acrylates, with such compounds as vinyl and vinylidene halides, produce only weak, brittle vulcanizates of little commercial utility.

Haloalkyl vinyl compounds containing the above-described structure which are suitable for use in this invention include the polymerizable haloalkyl vinyl esters of aliphatic monocarboxylic acids, the haloalkyl esters of acrylic acid, the haloalkyl vinyl ethers, and the haloalkyl vinyl ketones, all of which have a haloalkyl group separated from a single vinyl

group by connecting structure such as

(vinyl esters)

(acrylic esters)

—O—
(ethers)

and

(ketones)

The polymerizable esters of the above class include, but are not limited to, vinyl chloroacetate, vinyl chloropropionate, vinyl chlorobutyrate, vinyl bromoacetate, and other vinyl esters of halogen-substituted aliphatic monocarboxylic acids, 2-chloroethyl acrylate, 2-bromoethyl acrylate, 1,2-dichloroethyl acrylate, 3-chloropropyl acrylate, 3-bromopropyl acrylate, 2,3-dichloro-1-propyl acrylate, 2-bromo-3-chloro-1-propyl acrylate, 1,3-dichloro-2-propyl acrylate, 2,3-dibromo-1-propyl acrylate, monochloroisopropyl acrylate, monobromoisopropyl acrylate, 4-chlorobutyl acrylate and other chloroalkyl esters of acrylic acid. The preferred esters are the haloalkyl esters of acrylic acid containing from 4 to 8 carbon atoms and vinyl esters of halo-substituted aliphatic monocarboxylic acids containing from 3 to 6 carbon atoms.

The polymerizable haloalkyl vinyl ethers useful in the production of polymers according to this invention have the general structure

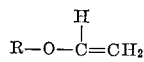

wherein R is a haloalkyl $[X\!-\!(CH_2)_n\!-\!]$ group and include, but are not limited to, chloromethyl vinyl ether, 2-chloroethyl vinyl ether, 2-bromoethyl vinyl ether, 1,2-dichloroethyl vinyl ether, 1-bromo-1-chloroethyl vinyl ether, 1-bromo-2-chloroethyl vinyl ether, 3-chloropropyl vinyl ether, 3-bromoethyl vinyl ether, 2,2,2-trichloroethyl vinyl ether, 2,3-dichloropropyl vinyl ether, 4-chlorobutyl vinyl ether and others, the haloalkyl vinyl ethers containing from 3 to 8 carbon atoms being preferred. The specific haloalkyl vinyl ether greatly preferred because of its ready availability, comparative low cost, and ability to produce superior polymers is 2-chloroethyl vinyl ether.

The haloalkyl vinyl ketones useful in this invention have the structure

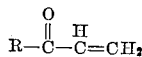

wherein R is a haloalkyl $[X\!-\!(CH_2)_n\!-\!]$ group and include, but are not limited to, 2-chloroethyl vinyl ketone, 2-bromoethyl vinyl ketone, 1,2-dichloroethyl vinyl ketone, 1-bromo-2-chloropropyl vinyl ketone, 1,2-dibromoethyl vinyl ketone, 3-chloropropyl vinyl ketone, 3,3-dichloropropyl vinyl ketone, 4-chlorobutyl vinyl ketone, and other haloalkyl vinyl ketones, preferably containing from 3 to 8 carbon atoms. The preferred haloalkyl vinyl ketone is 2-chloroethyl vinyl ketone because of its ease of manufacture and its ability to produce good polymers.

The three above-described sub-classes of monomeric materials which polymerize with the alkyl acrylates to produce interpolymers containing side-chain halogen-substitution are all within the class of compounds having the general structure

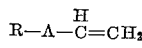

wherein R is a haloalkyl $[X\!-\!(CH_2)_n\!-\!]$ group and A is a connecting linkage selected from the class consisting of

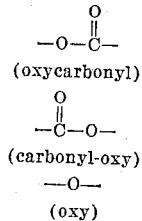

and

(carbonyl)

The preferred halogen atoms in the haloalkyl group are chlorine and bromine, but fluorine and iodine atoms may also be utilized.

In the practice of the present invention, monomeric mixtures, containing one or more monomers from each of the two essential classes disclosed, are prepared and subjected to polymerization. While the proportions of each of the two essential monomers in the monomeric mixture may vary somewhat, such variations must be within certain definite limits in order to produce rubbery interpolymers having the improved properties which are the objects of this invention, yet retaining the desirable properties possessed by the polymeric alkyl acrylates. For example, the mixture must contain from 80 to 98% by weight of one or more alkyl acrylates and from 2 to 20% by weight of one or more of the haloalkyl vinyl compounds. If the haloalkyl compound is present in an amount greater than 20% a very tough hard interpolymer is obtained which is deficient in rubber-like properties while if less than 2% of this type of monomer is utilized the resulting interpolymer is difficult to cure.

The polymerization of the above monomer mixtures may be effected by a number of known methods. For example, polymerization may be effected in solution or in a homogeneous system by the application of heat or actinic light with or without the presence of peroxygen compounds known to initiate polymerization. It is preferred, however, to carry out polymerization of the monomeric mixture in an aqueous emulsion in the presence of an emulsifying agent, a polymerization initiator and, if desired, a polymerization modifier.

Emulsifying agents which may be employed in the aqueous emulsion process include the fatty acid soaps such as sodium oleate, sodium palmitate and the like, the high molecular weight aliphatic sulfates and the aryl and alkaryl sulfonates such as sodium lauryl sulfate, sodium isopropyl naphthalene sulfonate, and the like, as well as the salts of high molecular weight bases such as the hydrochloride of diethylaminoethyloleamide, cetyltrimethyl ammonium methyl sulfate, and lauryl amine hydrochloride.

Polymerizaiton catalysts and initiators useful in any of the polymerization processes include benzoyl peroxide, potassium, sodium and ammonium persulfate, hydrogen peroxide, cumene hydroperoxide, and other peroxygen compounds as well as other types of polymerization initiators such as diazoamino benzene. Those soluble in hydrocarbons are, of course, preferred in the solution or homogeneous methods while those soluble in water are often preferred in the emulsion method of polymerization. Other substances which speed up the reaction such as a reducing agent in combination with one of the peroxygen compounds may be utilized. Polymerization modifies such as the sulfur-containing modifiers, including aliphatic mercaptans usually employed in the polymerization of butadiene hydrocarbons to form rubbery polymers, have much the same effect on the polymerization of the alkyl acrylates and may be advantageously employed when a very soft polymer is desired.

In the polymerization of the monomeric mixtures temperature is not critical, permissible reaction temperatures varying from as high as 100° C. or even higher down to 1° C. or even as low as —10 or —20, though the temperature preferably used is in the range of 20 to 80° C. In aqueous emulsion with temperatures of 20 to 80° C. it is possible to obtain quantitative yields of polymer in from about 1 to about 15 hours.

The copolymers can be vulcanized through the active halogen center by a wide range of curing agents including quinone dioxime, certain amines and combinations of amines with sulfur and sulfur-bearing materials, and oxides such as litharge. Sulfur and sulfur-bearing materials when used alone do not cure these polyacrylate elastomers. Rather they appear to act as retarders for cure and to serve as a form of age resistor. The presence of such a material aids the retention of tensile strength, elongation and hardness on high temperature oil and air aging. By balancing these materials with the amines, a wide range of properties may be obtained in the vulcanizate.

The best combination of properties is achieved with a curing system using triethylene tetramine (TETA) and benzothiazyl disulfide. These compounds have good original physical properties, low compression set and excellent aging qualities. Stearic acid is usually employed as a lubricant and basic reinforcing fillers such as SAF, FEF and HAF carbon black and Silene EF and Hi Sil silica compounds are used as reinforcing pigments. A typical recipe is:

| Material: | Parts |
|---|---|
| Interpolymer | 100 |
| Carbon black | 30–70 |
| Triethylene tetramine | 0.5–2.0 |
| Benzothiazyl disulfide | 1.0–3.0 |
| Stearic acid | 0.5–1.5 |

The compounded materials are cured for 10 to 45 minutes at 290° to 330° F. High temperature aging properties are further enhanced and compression set of the vulcanizates is improved by tempering or air-oven aging them for 12 to 24 hours at 300° F.

I have made the surprising discovery that if about 0.1 to 0.4 part of a copper carboxylate material is added to the triethylene tetramine-benzothiazyl disulfide cure system for copolymers of acrylic acid esters and the polymerizable haloalkyl vinyl compounds described above, the hot air aging properties of the vulcanizates are greatly improved in spite of the fact that copper is normally considered detrimental to the properties of elastomer vulcanizates. Even more surprising are the observations that corresponding compounds of similar transition metals, nickel and cobalt, do not similarly affect the heat aging properties of these vulcanizates and that even copper does not give the favorable results if a different cure system than that involving triethylene tetramine and benzothiazyl disulfide is selected.

The preparation of the improved alkyl acrylate interpolymer vulcanizates of this invention will be more clearly demonstrated in the following specific examples although it is to be understood that the invention is not limited in any way by the details therein set forth.

*Example I*

The following mixture of materials is prepared and subjected to polymerization conditions:

| Material: | Parts by weight |
|---|---|
| Ethyl acrylate | 95 |
| Chloroethylvinylether | 5 |
| Water | 200 |
| Potassium persulfate | .25 |
| Alkyl-aryl ether sulfonate | 4.25 |
| Sodium-2-methyl-7-ethylhendecyl-4-sulfate | 3.0 |

Water, emulsifier, and catalyst are charged to a reaction vessel, the vessel is sealed, flushed out with nitrogen and the contents are heated to 60° C. The monomers, previously washed with caustic, are mixed and the mixture washed with caustic, are mixed and the mixture is proportioned into the reaction at a uniform rate for 8 hours. The reaction is substantially complete in 10 hours. The polymer is in the form of latex. The latex is coagulated in hot (90° C.) calcium chloride solution and the coagulum is filtered, washed in clear water, and dried in a convection air oven at 105° C. The polymer has a raw Mooney, ML 4 at 212° F., of 55.

Portions of the interpolymer are compounded on laboratory rubber mills and subjected to standard ASTM test procedures for stress-strain. The cured stocks are first tempered for 24 hours at 200° F. to fully develop the physical properties. One portion of each sample is tested after tempering and a second portion is aged further for 72 hours at 350° F. in air and then tested. Compounding recipes and test results are tabulated below. Tensile strength and 300% modulus are reported as p.s.i., elongation is in percent. The percent tensile retained is obtained by dividing tensile strength after aging by tensile strength after tempering and multiplying by 100.

TABLE 1

| Sample | A (control) | B | C | D | E |
|---|---|---|---|---|---|
| Parts: | | | | | |
| Polymer | 100 | 100 | 100 | 100 | 100 |
| Carbon black | 50 | 50 | 50 | 50 | 50 |
| Stearic acid | 1.0 | 1.0 | 1.0 | 1.0 | 1.0 |
| Benzothiazyl disulfide | 2.0 | 2.0 | 2.0 | 2.0 | 2.0 |
| TETA | 1.5 | 1.5 | 1.5 | 1.5 | 1.5 |
| Copper stearate | 0 | 0.1 | 0.2 | 0.3 | 0.4 |
| Cure 30′ at 310° F. and temper 24 hrs. at 300° F. in air: | | | | | |
| Tensile | 1,850 | 1,900 | 1,950 | 1,825 | 1,800 |
| Elongation | 395 | 390 | 425 | 440 | 425 |
| 300% Modulus | 1,400 | 1,450 | 1,300 | 1,150 | 1,275 |
| After tempering, aged 72 hrs. at 350° F. in air: | | | | | |
| Tensile | 550 | 1,650 | 1,650 | 1,575 | 1,610 |
| Elongation | 385 | 370 | 390 | 410 | 400 |
| 300% Modulus | 510 | 1,410 | 1,350 | 1,150 | 1,275 |
| Percent Tensile retained | 29.7 | 86.9 | 84.6 | 86.2 | 89.4 |

The addition of 0.1 to 0.4 part of copper stearate to the control recipe results in an 85%–90% retention of tensile strength after the heat aging period compared to only about 30% retention in the control.

*Example II*

Hycar 4021, produced by the B. F. Goodrich Chemical Company, is a copolymer of an acrylic acid ester and a halogen-containing derivative of the type described in Example I. Portions of this material are compounded to compare the additive effects of transition metals, copper, nickel and cobalt. Compounding, cure and test data are set forth in Table 2.

TABLE 2

| Sample | F (control) | G | H | J | K | L | M |
|---|---|---|---|---|---|---|---|
| Parts: | | | | | | | |
| Polymer | 100 | 100 | 100 | 100 | 100 | 100 | 100 |
| Carbon black | 50 | 50 | 50 | 50 | 50 | 50 | 50 |
| Stearic acid | 1.0 | 1.0 | 1.0 | 1.0 | 1.0 | 1.0 | 1.0 |
| Benzothizyl disulfide | 2.0 | 2.0 | 2.0 | 2.0 | 2.0 | 2.0 | 2.0 |
| TETA | 1.5 | 1.5 | 1.5 | 1.5 | 1.5 | 1.5 | 1.5 |
| $Cu(Ac)_2 \cdot H_2O$ | | 0.3 | 0.6 | | | | |
| $Ni(Ac)_2 \cdot 4H_2O$ | | | | 0.36 | 0.72 | | |
| $Co(Ac)_2 \cdot 4H_2O$ | | | | | | 0.36 | 0.72 |
| Cure 30′ at 310° F. and temper 24 hrs. at 300° F. in air: | | | | | | | |
| Tensile | 1,520 | 1,790 | 1,660 | 1,650 | 1,130 | 1,500 | 1,200 |
| Elongation | 450 | 440 | 470 | 460 | 605 | 455 | 505 |
| 300% Modulus | 975 | 1,225 | 1,090 | 1,025 | 625 | 960 | 790 |
| After tempering aged 72 hrs. at 350° F. in air: | | | | | | | |
| Tensile | 300 | 1,550 | 1,350 | 750 | 210 | 325 | 280 |
| Elongation | 440 | 395 | 500 | 490 | 440 | 495 | 500 |
| 300% Modulus | | 1,175 | 825 | 600 | | | |
| Percent Tensile retained | 19.7 | 86.7 | 81.4 | 45.4 | 18.5 | 21.6 | 23.4 |

As in Example I, the compound of copper offers great increase in retention of tensile strength after heat aging, better than 80% as compared to less than about 20% for the control. The similar metals, nickel and cobalt offer no such protection and actually tend to retard the cure.

I have specifically described representative embodiments of my invention. Variations in scope therefrom are intended to be covered by the following claims.

I claim:

1. An improved triethylene tetramine-benzothiazyl disulfide vulcanizate of an interpolymer comprising 80% to 98% by weight of an acrylic acid ester and 2% to 20% by weight of a halogen containing derivative consisting of a compound composed exclusively of carbon, hydrogen, oxygen and halogen atoms and having a single vinyl

group separated from a haloalkyl group by an intervening oxygen-containing structure, said vulcanizate containing from 0.1 to 0.4 part per 100 parts of interpolymer of a copper carboxylate, said carboxylate being selected from the group consisting of copper acetate and copper stearate.

2. The improved vulcanizate of claim 1 wherein the halogen containing derivative is a haloalkyl vinyl compound selected from the class consisting of compounds of the structures:

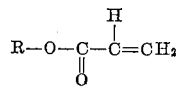

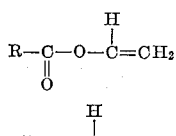

and

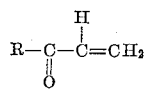

wherein R is a haloalkyl radical, said vulcanizate containing 0.1 to 0.4 part per hundred parts of interpolymer of a copper carboxylate said carboxylate being selected from the group consisting of copper acetate and copper stearate.

3. The vulcanizate of claim 2 wherein the copper carboxylate is copper stearate.

4. The vulcanizate of claim 2 wherein the copper carboxylate is copper acetate.

References Cited by the Examiner

UNITED STATES PATENTS

| | | | |
|---|---|---|---|
| 2,538,297 | 1/1951 | Nie | 260—23 |
| 2,954,356 | 9/1960 | Merrifield | 260—45.75 |
| 3,201,373 | 8/1965 | Kaizerman | 260—79.5 |

LEON J. BERCOVITZ, *Primary Examiner.*

G. W. RAUCHFUSS, JR., *Assistant Examiner.*